United States Patent
Stewart et al.

(10) Patent No.: US 6,502,129 B1
(45) Date of Patent: Dec. 31, 2002

(54) COMPUTER NETWORK ADAPTOR

(75) Inventors: Daniel B. Stewart, Lanark (CA); Paul Ramsden, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/472,186

(22) Filed: Dec. 27, 1999

Related U.S. Application Data

(62) Division of application No. 08/948,314, filed on Oct. 10, 1997, now Pat. No. 6,061,742.

(51) Int. Cl.7 .................................................. G06F 15/177
(52) U.S. Cl. ....................................... 709/222; 709/223
(58) Field of Search ................................. 709/250, 220, 709/221, 222, 223, 224; 714/4

(56) References Cited

U.S. PATENT DOCUMENTS

| | | | | |
|---|---|---|---|---|
| 5,299,314 A | | 3/1994 | Gates ..................... 709/250 X |
| 5,303,344 A | | 4/1994 | Yokoyama et al. ..... 709/205 X |
| 5,307,354 A | | 4/1994 | Cramer et al. .............. 714/717 |
| 5,361,372 A | | 11/1994 | Rege et al. ................. 709/234 |
| 5,535,338 A | * | 7/1996 | Krause et al. ............... 709/222 |
| 5,619,650 A | | 4/1997 | Bach et al. ............. 709/230 X |
| 5,630,048 A | | 5/1997 | Joie et al. ...................... 714/40 |
| 6,052,733 A | * | 4/2000 | Mahalingam et al. ....... 709/223 |
| 6,067,569 A | * | 5/2000 | Khaki et al. ................. 709/224 |
| 6,314,525 B1 | * | 11/2001 | Mahalingham et al. ........ 714/4 |

* cited by examiner

*Primary Examiner*—Patrice Winder

(57) ABSTRACT

A network adaptor having a first and second computer interface for connection to the administration and network interface of a computer is disclosed. The network adaptor further comprises a network interface for connecting the adaptor to a computer network. A processor forms part of the adaptor. The adaptor separates administration data from network data and exchanges administration data with the computer administration interface. Preferably, the computer network interface and the adaptor network interface comprise Ethernet interfaces. The administration interfaces are preferably serial ports. Preferably, the network adaptor has its own network identifier and offers network services such as a TCP/IP stack, and a higher level network service such as a TELNET, FTP or SNMP service. Adminstration data may be directed to the adminstration port by the service. The adaptor may also comprise environmental sensors and switches, which may monitor and control the operation of the attached computer. A method used by the adaptor is also disclosed.

2 Claims, 8 Drawing Sheets

COMPUTER NETWORK ADAPTOR

CROSS-REFERENCE TO RELATED APPLICATIONS

This application is a divisional of application Ser. No. 08/948,314 filed Oct. 10, 1997 U.S. Pat. No. 6,061,742.

FIELD OF THE INVENTION:

The present invention relates to computer network adaptors, and more particularly to a computer network adaptor, and the method used by such an adaptor, for providing network data and administration data to a computer.

BACKGROUND OF THE INVENTION:

Modern computers typically comprise a central processing unit ("CPU") interconnected to dynamic memory, peripherals, and read only memory. Upon initialization of such a computer, instructions are loaded from the read only memory ("ROM") which, in turn, direct the computer to execute a set of initial program load instructions. These instructions typically direct the processor to access an initial peripheral in order to properly load further operating instructions. The ROM may also direct the computer to display information in response to such an initial program load sequence on a second peripheral.

In a personal computer for example, a ROM basic input/output system ("BIOS") directs a central processor ("CPU") upon initialization to display certain status information on a display peripheral such as a monitor and to query a local peripheral such as a keyboard for instructions. Thereafter, the BIOS instructs the CPU to perform an initial program load sequence to load a program from another peripheral such as a disc drive, into dynamic memory. During this initial program load further display information is presented to the display peripheral and the initial program load may be modified or aborted using the keyboard input peripheral.

In other computer systems such as in existing. UNIX work stations or network servers, ROM directs a CPU and hence the computer to obtain further initial program load parameters from a terminal, such as a VT100 console, which is interconnected to the UNIX computer by a console port. Upon initialization, a system administrator may instruct a work station by a terminal connected to the console port to load the required UNIX operating system from another peripheral. During loading, any display and status messages are presented to the console port, which in turn directs the terminal to display such information. After loading of the operating system is complete, the console port remains active, under control of a UNIX process, allowing an administrator to provide administration commands to the computer and operating system at any time. Thus, the console port actually acts as an administration port, providing administrative access to the computer. It is the first point of access and provides administration access at all times in most UNIX based computers.

In modem computers, one of the peripherals interacting with the CPU is a network input/output ("I/O") interface. The network I/O interface provides the computer with a data communications link to other computers and peripherals in order to allow for the exchange of data. At present, such I/O interfaces are often Ethernet interfaces to allow networked computers to communicate using an Ethernet. This network I/O interface however, is distinct from the administration port described above. Indeed, it is known to allow the loading of an operating system via this network I/O interface after proper initial program load instructions and parameters have been obtained through the administration port. Thus, for example, in a UNIX environment, it may be possible to direct a UNIX work station to load the UNIX operating system from another network server through the network interface. Upon initialization of a UNIX computer system, the system administrator may use a terminal, connected to the console port in order to direct the computer to load the operating system through the network I/O interface.

This design is premised largely on the assumption that administrators have direct physical access to the computer in order to access the administration port. In a network environment however, such physical access is often not guaranteed and indeed often not available. As the console port is often the first and last port of access for a computer, remote access to the administration port, separate from network access to the computer has been suggested.

One solution has involved connecting the console ports of a plurality of UNIX computers to a terminal server. A terminal server functions as a concentrator and comprises a plurality of inputs for a plurality of console ports and a single output. The output may be a single console port output or a network output. A system administrator may connect a single terminal to the output side of a terminal server device. The inputs of the terminal server may be connected to the individual console ports of a plurality of computers each having such a console port. Thus, a system administrator can centralize administration tasks at a single location by concentrating the console ports for multiple administered computers.

While reducing the number of terminals required to be connected to a plurality of computers, this solution still requires two separate physical external connections for each computer connected to a data network: the network I/O interface and the administration port interface. Moreover, this solution requires individual physical connections between each computer and the terminal server and thus suggests physical proximity of the administration facilities and administrator to the plurality of computers whose console ports have been concentrated by the terminal server. Additionally, without further connectivity, the console ports may only be accessed at a single physical location.

A further solution may be found in certain modern telephony systems. In such systems, for example, a plurality of proximate UNIX computers are networked to each other by a local area network ("LAN"). Each computer comprises a network I/O interface connecting the networked computers to each other. Typically, the computers use a known datalink and network protocol, adhering to the IEEE 802 standard, to transport data along the LAN. The LAN is often an Ethernet. Data is exchanged by a known protocol such as IPX or TCP/IP. This LAN is used to exchange data required for call processing. Additionally, the computers are interconnected by a separate physical local control or administration network. As each of the computers is further equipped with a console port, the plurality of console ports are interconnected by a console port network. The console port network allows a single central computer (known as an operations controller, or "OC") in the network to access the console ports of the remaining computers (known as service computers, or "SC"s). The console port of the OC is connected to a physical interface, such as a terminal having a keyboard and display. Thus, the OC is accessed by this physical interface and can pass initial program load and administration instructions to the SCs by the console port network. For example, the operating system or other initial program loading information for the SCs on the network may be loaded via the console port network. As is apparent, this configuration requires two physical sets of network connections: a console port network, and a data exchange network, as well as two physical sets of network cabling.

In fact, often such telephony systems incorporate a third network used for equipment monitoring ('telemetry') of operating conditions of each of the computers, as more particularly described in U.S. Pat. No. 5,594,893. This third telemetry network, typically comprises a plurality of local serial links ("LSL's"), interconnecting a plurality of SCs, housed in a single shelf to a frame supervisory controller ("FSC"), also housed in that shelf. A remote serial link ("RSL") connects an OC, typically housed in a separate shelf to the FSC of the SCs. The LSL are interconnected to monitoring equipment that monitors such conditions, as power converter status, circuit breaker status, temperature and the like for each of the networked computers. Data representing the monitored conditions which is periodically transferred via the LSLS, FSC and RSL to the OC. In response to sensed conditions, the OC may initiate graceful shutdowns of the SCs, or otherwise report or react to sensed conditions. As will be appreciated the use of such a telemetry network introduces the use of a third physical network with a third set of network cabling.

It is an object of the present invention to provide an improved computer network adaptor allowing an improved network architecture for data exchange and administration of a plurality of network computers.

SUMMARY OF THE INVENTION:

In accordance with an aspect of the invention, there is provided an adaptor for connecting a computer to a network, said adaptor comprising: an adaptor network interface, for connecting the adaptor to the network to exchange network data between the adaptor and the network; a first interface, for connecting the adaptor to a computer network interface of the computer to pass network data between the adaptor and the computer; a second interface, for connecting the adaptor to a computer administration interface of the computer to exchange administration data with the computer; and a processor in communication with the adaptor network interface, the first interface and the second interface, the processor adapted to separate the administration data from the network data and exchange the administration data with the second interface and the computer.

In accordance with another aspect of the present invention, there is provided a computer for connection to a network, comprising an adaptor for connecting the computer to the network to exchange data therewith, comprising means to separate administration data from data on the network at the adaptor; a processor adapter to process the administration data to respond thereto.

In accordance with yet another aspect of the invention there is provided in combination, a computer and a network adaptor, the computer comprising a computer network interface, suitable for communicating with a data network; a computer console port, suitable for connection to a terminal to administer the computer; the network adaptor comprising a first network interface connected to the computer network interface; a console port interface connected to the computer console port; a second network interface for connection to the data network for communications with the data network; and a processor adapted to exchange data between the second network interface, and the network; between the first network interface and the computer network interface, and between the console port interface and the console port.

In accordance with a further aspect of the invention there is provided a computer comprising a first processor, and a network adaptor in communication with the processor, the network adaptor comprising a network interface for connecting the adaptor to a computer network to exchange network data; a connection between the adaptor and the first processor to exchange network data between the adaptor and the first processor; a second processor; adapted to provide a network service at the network interface, the service accessible through the computer network; and further adapted to exchange administration data between the network, the network interface, and the first processor, using the network service.

In accordance with yet a further aspect of the invention there is provided a method of providing administration and network data to a computer to be administered, the computer having a first and second processor, the method comprising the steps of a) associating the network data with a first network address; b) associating the administration data with a second network address; c) transferring the administration and network data in association with the first and second network addresses to the second processor; d) receiving the network and adminstration data in association with the first and second network addresses at the second processor; e) identifying the administration data by the second network address at the second processor; f) passing the administration data from the second processor to the first processor; g) processing the administration data at the first processor, to administer the computer.

BRIEF DESCRIPTION OF THE DRAWING:

In figures which are illustrative of preferred embodiments of the present invention.

Figure 1:
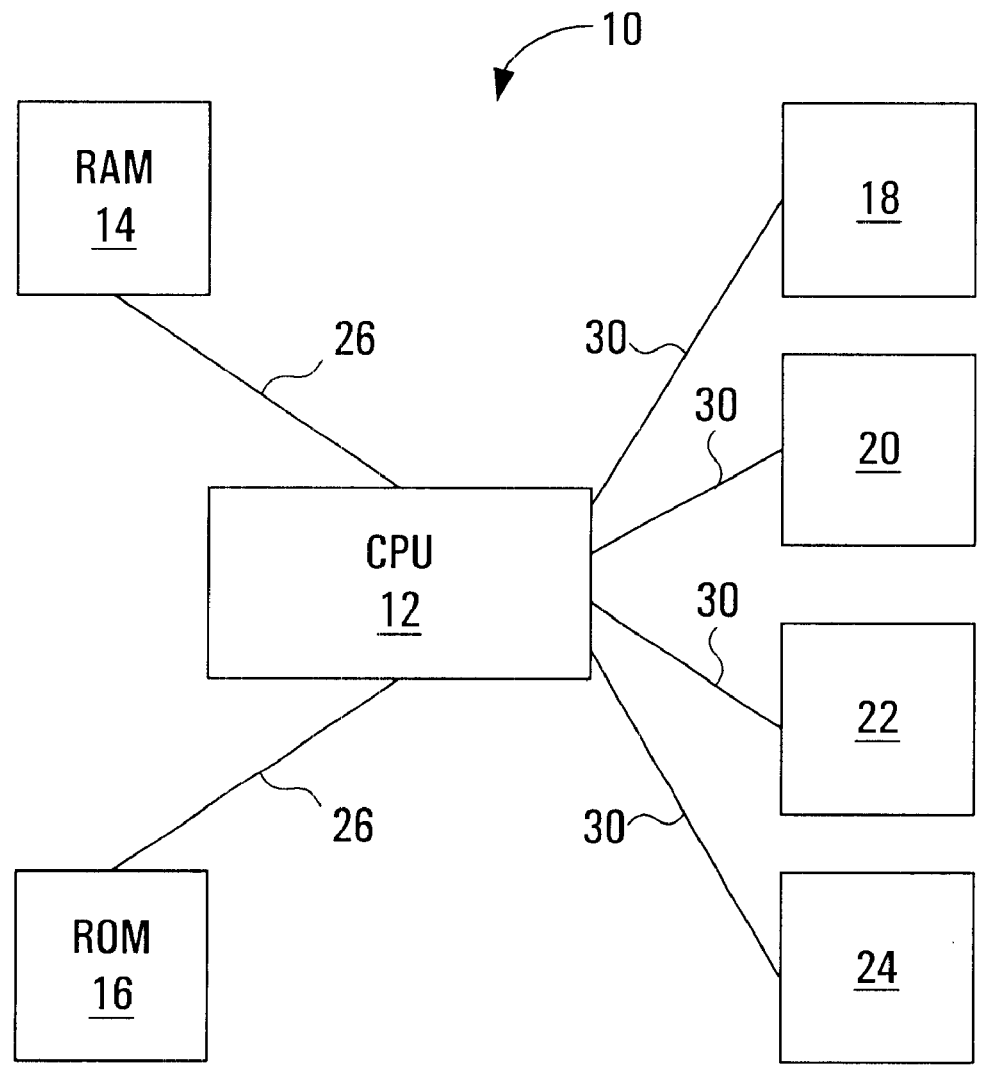
FIG. 1 illustrates in a block diagram, the architecture of a conventional UNIX based computer.

DETAILED DESCRIPTION OF THE PREFERRED EMBODIMENTS:

FIG. 1 illustrates by way of example, the architecture of a known UNIX computer 10. A processor is comprised of CPU 12, random access memory 14 ("RAM") and ROM 16, interconnected by data and address buses 26. Further, the processor is connected to a plurality of peripherals 18, 20, 22, 24 including a console port 22 and a network I/O interface 24, by bus 30. As described below, peripheral 20 may for example be a second network I/O interface. Bus 30 is a conventional peripheral bus such as a PCI, ISA, VESA bus or any other suitable bus. Peripherals 18, 20, 22, and 24 could also be connected to the processor and CPU 12 by point-to-point connections rather than a bus.

Figure 2:
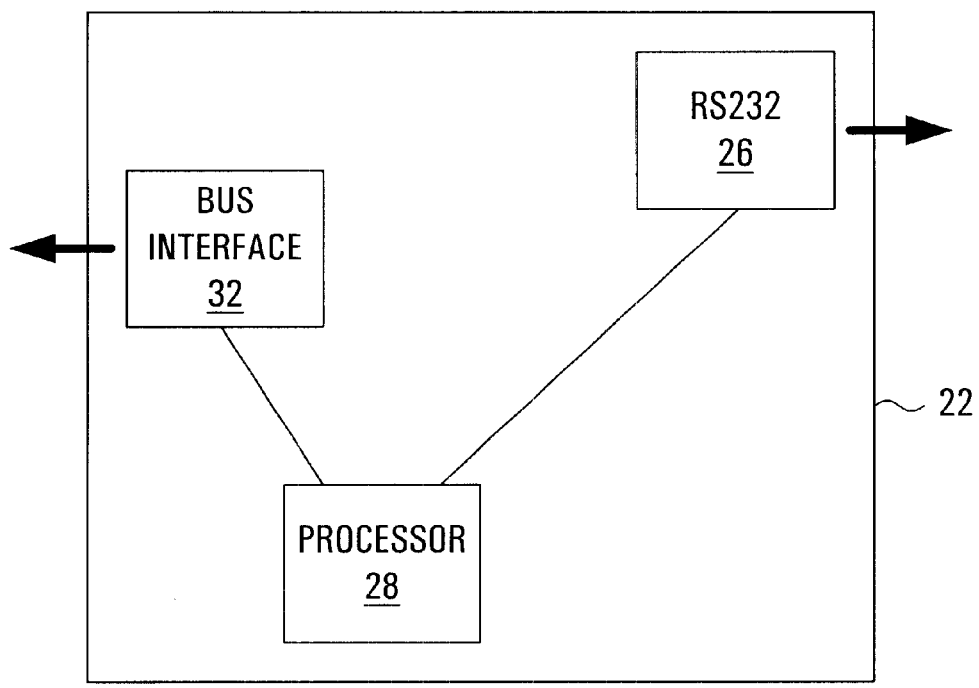
FIG. 2 illustrates in a block diagram, a portion of the computer of FIG. 1.
Figure 3:
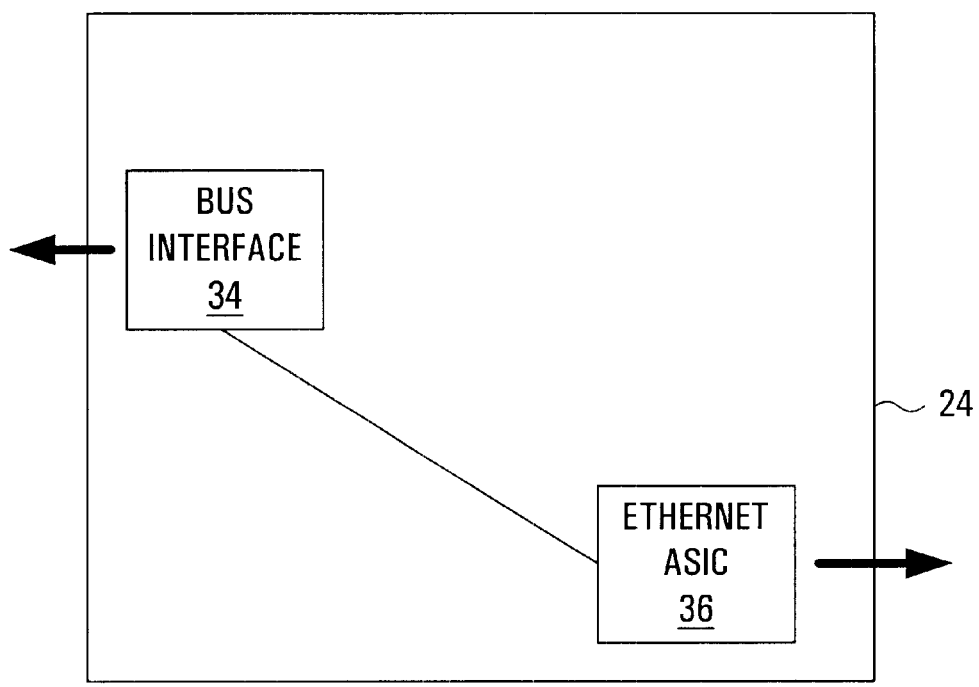
FIG. 3 illustrates in block diagram, a further portion of the computer of FIG. 1.

As illustrated in FIGS. 2 and 3, console port 22, comprises an RS-232 port 26 and associated connector (not shown), and an accompanying processor 28 to drive a standard terminal connected to the connecter, as well as bus interface 32. Bus interface 32 provides sufficient hardware to allow console port 22 to communicate with CPU 12 through bus 30. Network I/O interface 24 is a standard 10 Base-T Ethernet interface, also comprising a bus interface 34, interconnected to an Ethernet processor or Application Specific Integrated Circuit 36, ("ASICH")and further comprising a physical connector (not shown), such as an RJ-45 connector, or the like for connecting interface 24 to a network of like interfaces.

Figure 4:
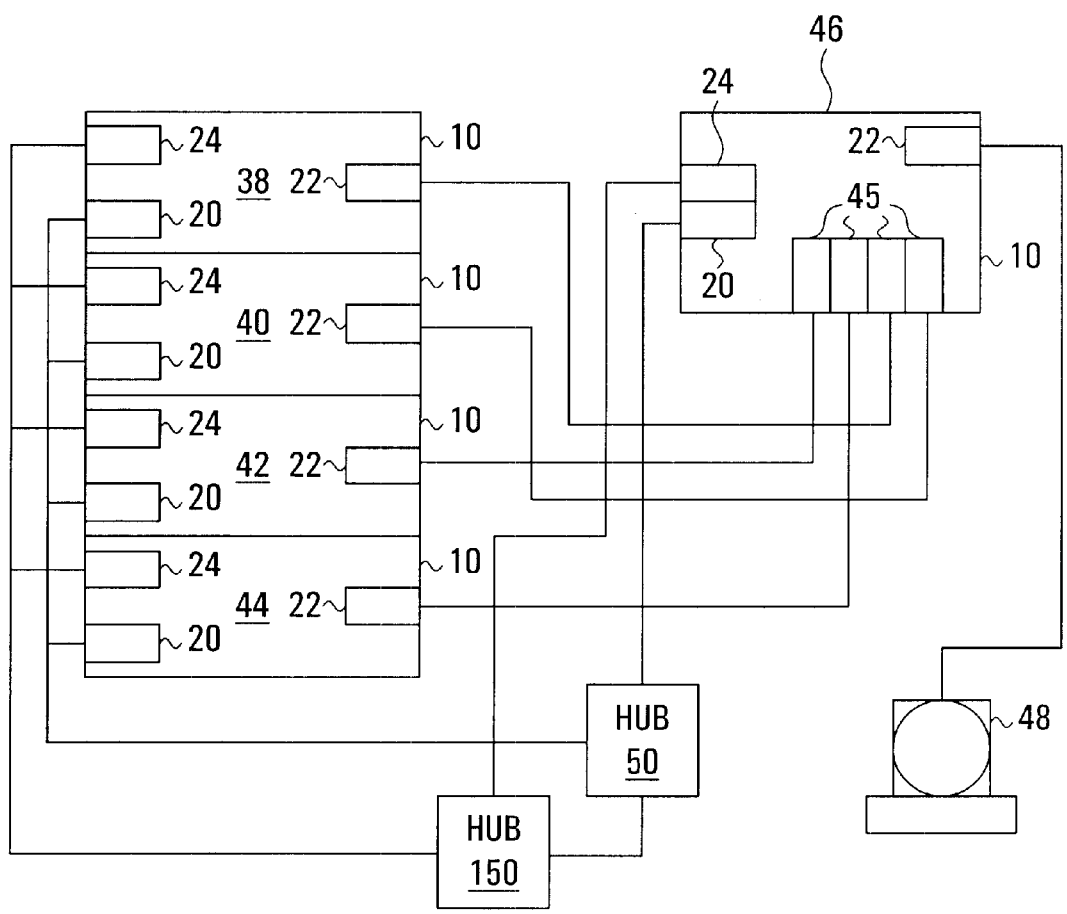
FIG. 4 illustrates in block diagram, a plurality of computers as illustrated in FIG. 1, connected to two local area networks.

FIG. 4 illustrates a configuration of a plurality of UNIX computers 38, 40, 42, 44 and 46, each being the type of computer 10 illustrated in FIG. 1 and each being interconnected to each other along three networks: two LANs of the Ethernet type and a console port, serial network, connecting console ports 22 computers 38, 40, 42 and 44 computers to a central operations computer or OC 46. This configuration of UNIX computers 38, 40, 42, 44 and 46 is used in telephony applications.

OC 46 acts as a central node in the console port network. OC 46 differs from the remaining service computers, or SCs 38, 40, 42, and 44 in that it comprises several serial ports 45 to connect to each of the console ports 22 of the associated SCs 38, 40, 42 and 44. OC 46 is the external access point to the network of console ports 22. The console ports 22 of the SCs 38, 40, 42 and 44 may only be accessed through OC 46. OC 46 further comprises its own console port 22 for administrative access to OC 46. This console port is interconnected to terminal 48, which provides central administrative access to the plurality of computers 38, 40, 42, 44, and 46 connected to the console port network. Accordingly, the network of console ports 22, is often referred to as an administration network.

Each of the computers 38, 40, 42 and 44 is further provided with two network I/O interfaces 20 and 24 (also see FIG. 3). One of the network I/O interfaces 24 of each SC 38, 40, 42 and 44 is interconnected to the interfaces of the other SCs to provide a local area data exchange network, for the exchange of data between SCs 38, 40, 42 and 44. Each of the network interfaces 20 is connected to a port of a multiport 10 Base-T network hub 50. Each of the network interfaces 24 is connected to a second hub 150. This ensures that data on the network is properly distributed to all computers connected to the LAN. The second network I/O interface 20 of each SC 38, 40, 42, 44 is the same type as interface 24 for interconnection of the SCs to form a second, redundant data network, as more particularly described in U.S. patent application Ser. No. 08/251,990, the contents of which are incorporated herein by reference. Hub 50 and 150 are further conndected to network interfaces 20 and 24 of OC 46. Hub 50 and 150 are directly connected and carry identical traffic at all times. Only one of interfaces 20 and 24 for each computer 38, 40, 42, 44 and 46 is active at any one time. Thus, the operating system of computers 38, 40, 42, 44 and 46 only sense a single LAN at any time. Each of the computers 38, 40, 42, 44, 46 monitors the network and each may independently switch between the primary and secondary LAN when a fault is detected. OC 46 may direct SCs 38, 40, 42, and 44 to switch between primary and secondary networks. Alternatively SCs 38, 40, 42, and 44 may individually switch between primary and secondary networks.

Figure 5:
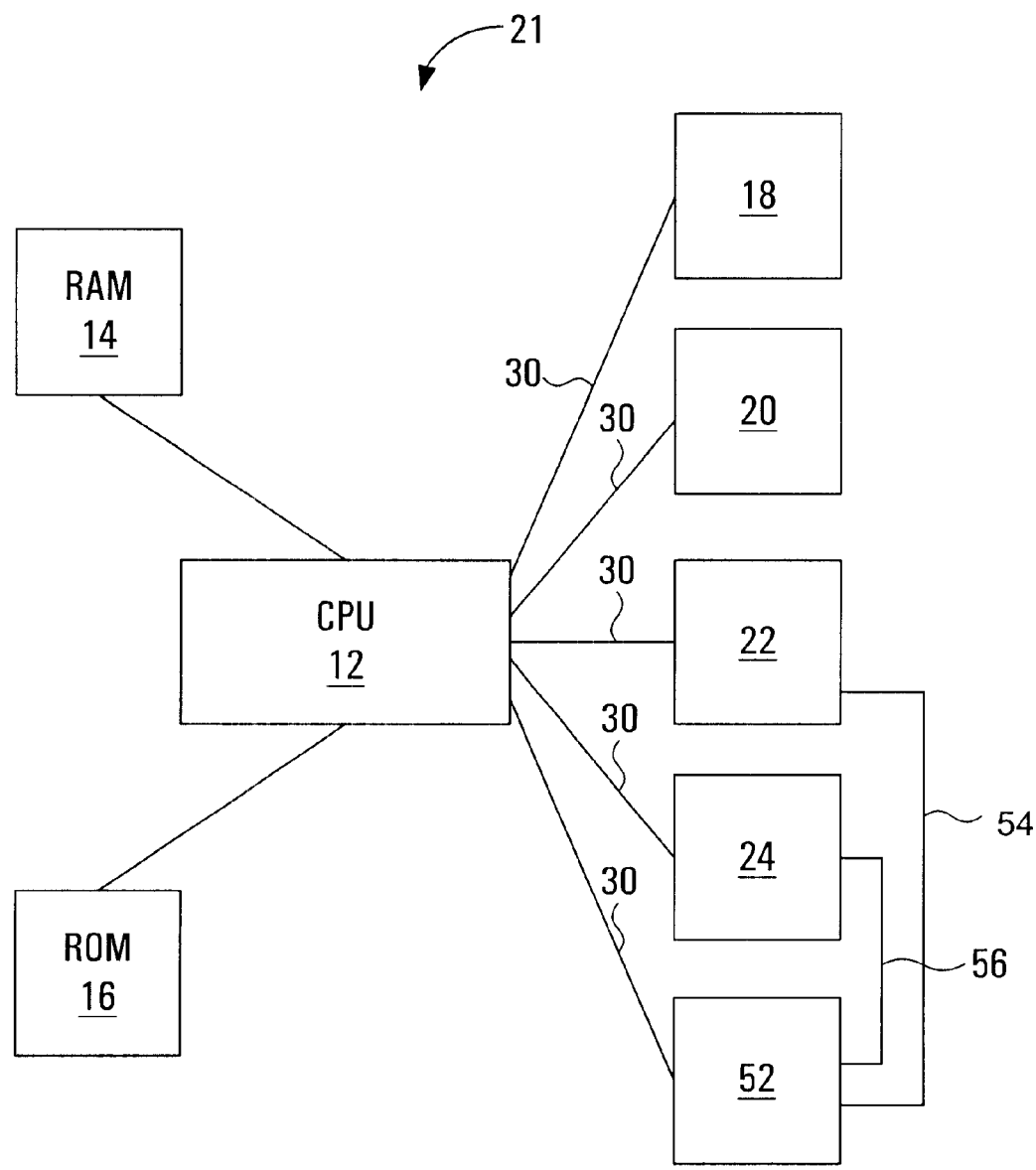
FIG. 5 illustrates in block diagram, the architecture of a UNIX computer incorporating an adaptor in accordance with an aspect of the present invention.

FIG. 5 illustrates a computer 21 of the same general configuration as computer 10 illustrated in FIG. 1 further incorporating an administration interface network adapter 52 in accordance with an aspect of this invention. The administration interface network adapter 52 is a peripheral, like peripherals 18, 20, 22 and 24. It is interconnected to CPU 12 by bus 30. As will be described below, interconnection to bus 30 is not absolutely necessary and may only provide power to adaptor 52.

Adaptor 52 interconnects console port 22 of computer 21 with at least one of network I/O interface 24 and network I/O interface 20. As shown in FIG. 5, by way of connections 54 and 56, adaptor 52 connects console port 22 with network I/O interface 24. Adaptor 52 may further be interconnected with a network. Thus, effectively, adaptor 52 provides a single physical access point to console port 22 and at least one network I/O interface 24 of computer 21.

Figure 6:
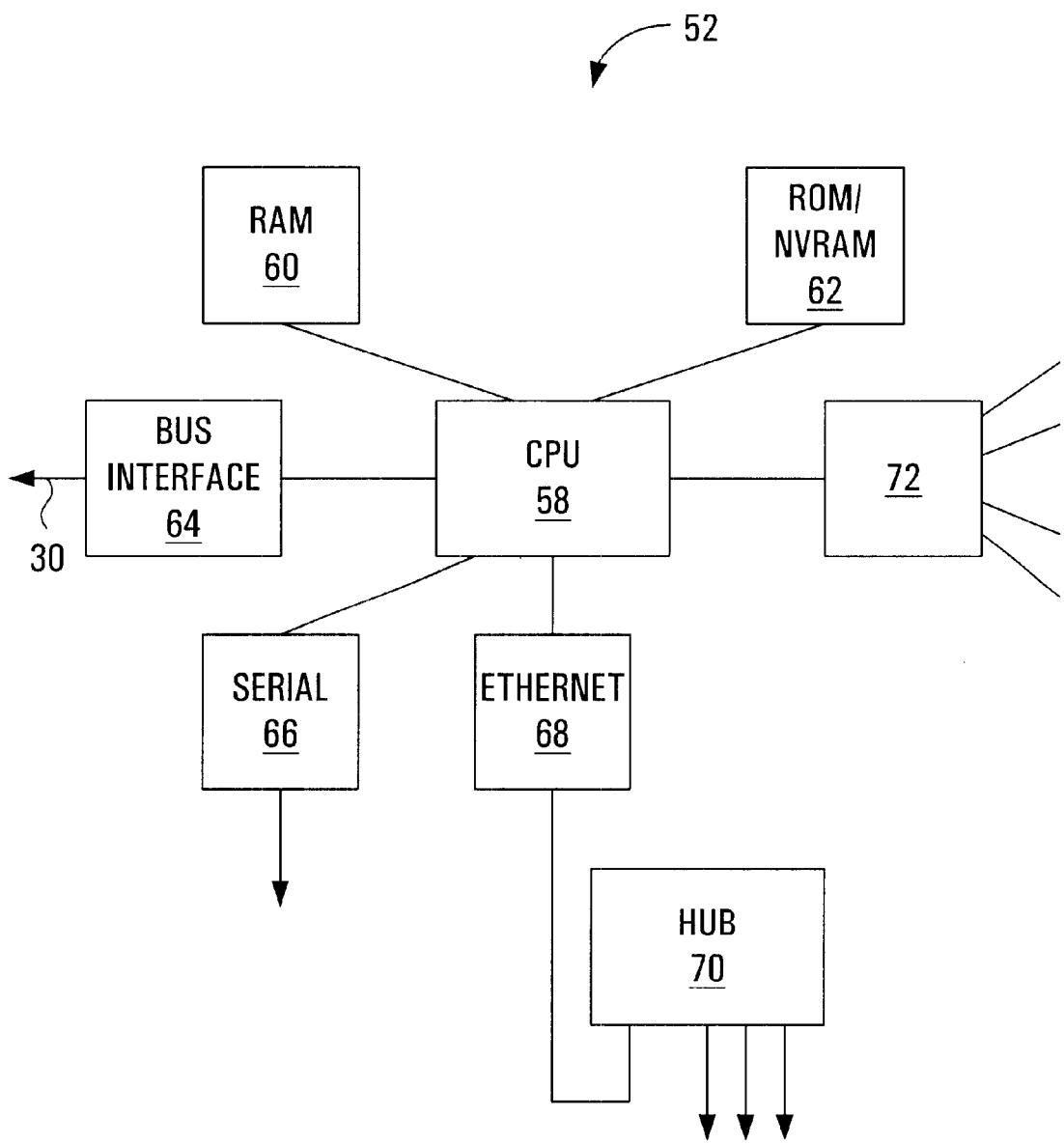
FIG. 6 illustrates in block diagram, a network adaptor in accordance with an aspect of the present invention.

As further illustrated in FIGS. 5 and 6, administration interface adaptor 52 comprises a processor comprising CPU 58, interconnected to RAM 60 and ROM 62. CPU 58 is connected to bus interface 64 (for connection with bus 30 of CPU 12); a serial port 66 (for connection to connection 54); an Ethernet interface 68; and an Ethernet hub 70. Additionally, a plurality of environmental sensors (not shown) and controls (not shown) may be connected to peripheral port 72, also interconnected to CPU 58.

Hub 70 comprises a four port 10 Base T Ethernet hub. One of the ports of hub 70 is connected to Ethernet interface 68 of adaptor 52. Ethernet interface 68 provides Ethernet access for CPU 58. As described below, ports of hub 70 may additionally be connected to the Ethernet connector of a computer network interface adaptor 24, and the primary and secondary LANs formed by a plurality of networked computers.

Figure 6A:
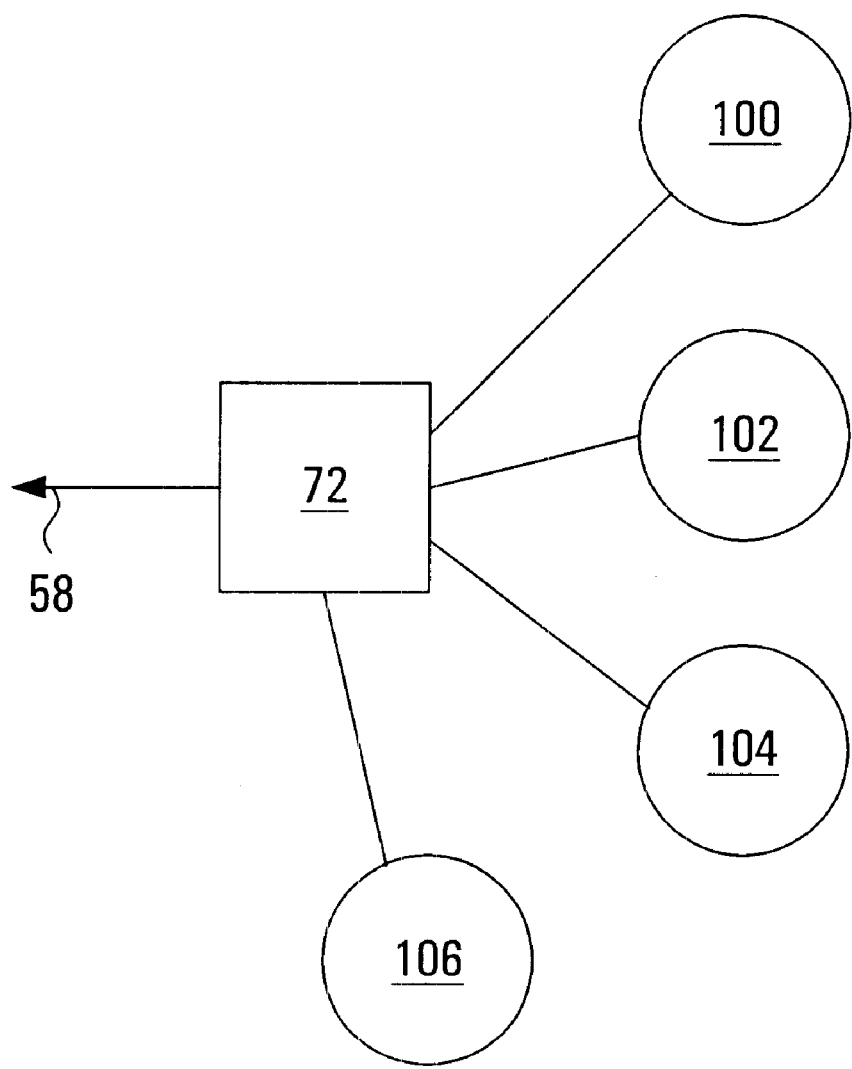
FIG. 6a illustrates in block diagram, a portion of a network adaptor in accordance with an aspect of this invention.

As illustrated in FIG. 6a, port 72 is adapted to connect a plurality of environmental sensors, 100 and 102. These may be heat, current, voltage or operation (such as for sensing operation of a fan) sensors that provide digital information regarding their sensed conditions to CPU 58. These sensors are ideal for sensing the operating conditions of a computer 21 (FIG. 5) associated with adapter 52. Additionally, port 72 is connected to switch or relays 104 and 106, all of which may be controlled by CPU 58.

As illustrated in FIG. 6, ROM 62 stores program instructions for CPU 58, which provide an operating system for CPU 58. This operating system directs CPU 58 to process and route data received from bus interface 64; serial port 66; Ethernet interface 68; and port 72. The program instruction may for example, implement an internet protocol ("IP") stack, network stack to route, fragment and reassemble network data packets in accordance with the known IP protocol. The program may also implement on top of the IP stack a transport control protocol stack ("TCP") or a user datagram protocol ("UDP") stack. It may further implement on top of the TCP/IP a TELNET, file transport protocol ("FIP"), or hyper text transfer protocol ("HTTP") application, or the like. The program may further implement atop a UDP/IP stack, a trivial file transfer protocol ("TFTP") application, or a simple network management protocol ("SNMP") application. Alternatively, instead of implementing TCP/IP stack, an analogous internet packet exchange ("IPX") or vines internet protocol ("VIP") stack and associated applications could be implemented by the program.

CPU 58, serial port 66, Ethernet interface 68 and port 72 may all be integrated on a single commercially available integrated circuit such as a Motorola 68EN302 processor. Hub 70 may be implemented using a commercially available LTX914 integrated circuit. The adaptor 52 may be constructed on a standard size PC board mountable in a standard computer PCI slot. LEDs (not shown) may extend from the board to indicate status (fault/no-fault) and network activity. Connections 54 and 56 (FIG. 6), connecting serial port 66 and a port of hub 70 to network I/O interface 24 and console port 22 of computer 21 may be short "loop-back" type cables.

Figure 7:
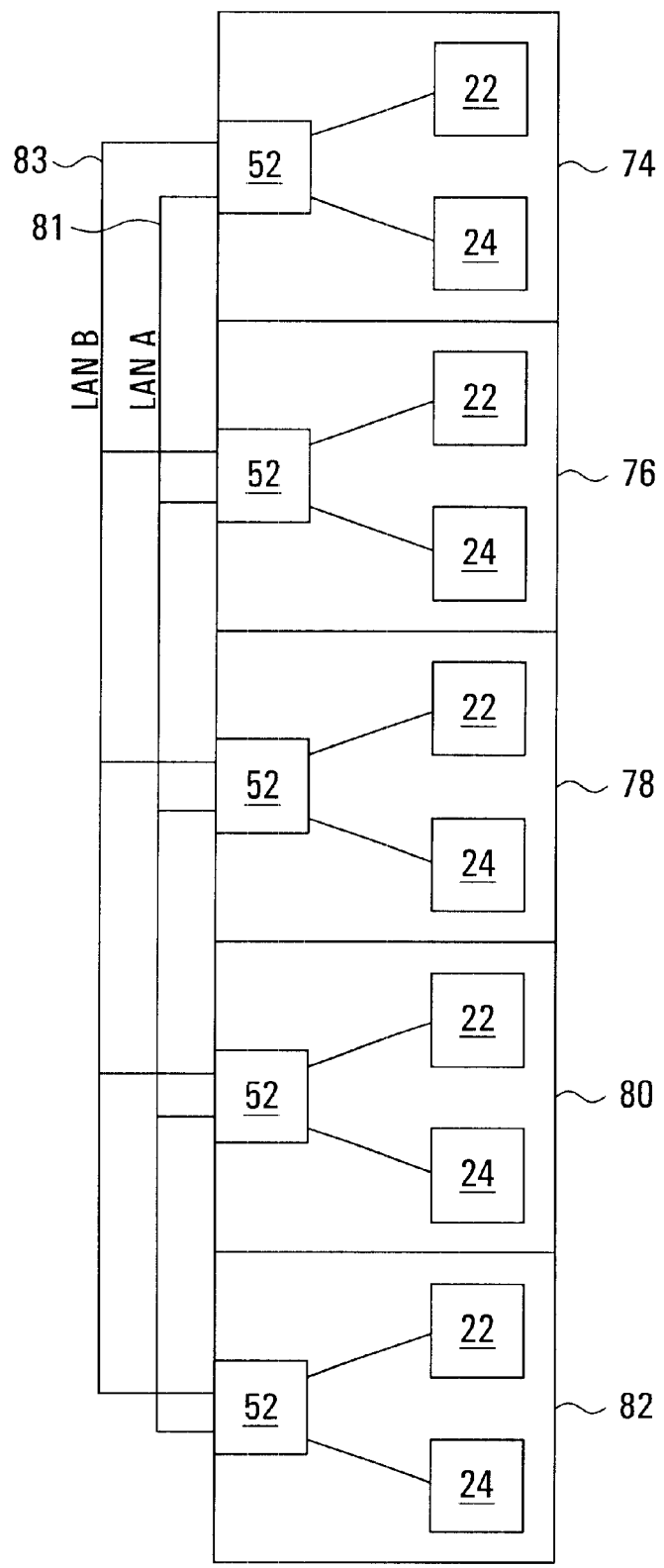
FIG. 7 illustrates in block diagram, a plurality of networked computers as shown in FIG. 5.

FIG. 7 illustrates a network of a plurality of computers 74, 76, 78, 80 and 82 of the type of computer 21 illustrated in FIG. 5, arranged in a network similar to that of FIG. 4, but incorporating adaptor 52 in accordance with an aspect of this invention. The network I/O interface 24 and console port 22 of each computer 74, 76, 78, 80 and 82 are connected to adaptor 52. The network I/O interface 24 of each computer is connected to one port of hub 70 (FIG. 6) of an associated adaptor 52 of the computer. The console port 22 of each computer 74, 76, 78, 80 and 82 is connected to serial port 66 of an associated adaptor 52. Cabling 81 interconnects a further port of hub 70 (FIG. 6) of each computer 74, 76, 78, 80 and 82 to form a LAN, LAN-A, and cabling 83 interconnects a fourth port of hub 70 of each adaptor 52 of each computer 74, 76, 78, 80 and 82 to form a second LAN, LAN-B. CPU 58 under program control of software in ROM 62 of each adaptor 52 of each computer 74, 76, 78, 80, and 82 causes the adaptor to monitor both LAN-A and LAN-B to determine when either LAN fails. In the event of a LAN-A failure, LAN-B is made active by adaptors 52. Each of the adaptors 52 switch between LAN-A and LAN-B independently.

Figure 8:
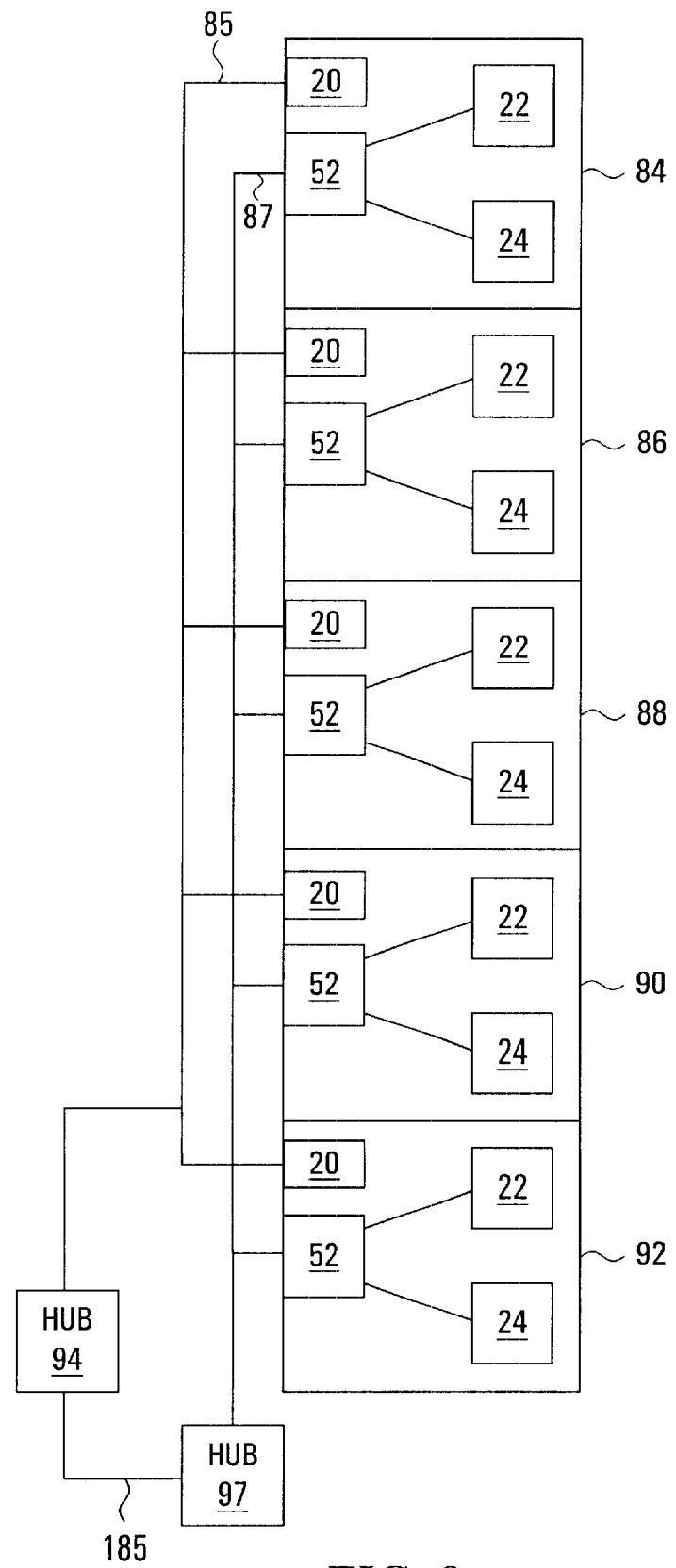
FIG. 8 illustrates in block diagram, a further plurality of networked computers as shown in FIG. 5.

FIG. 8 illustrates an alternate network of a plurality of computers 84, 86, 88, 90 and 92 of the type of computers 21 illustrated in FIG. 5, arranged in a network similar to the network of FIG. 7. Each computer 84, 86, 88, 90 and 92, however, has two network I/O interfaces of the type of interfaces 20 and 24 (FIG. 3). For each computer 84, 86 88, 90 and 92, network I/O interface 24 is interconnected to a port of hub 70 (FIG. 6) of an adaptor 52. The other network I/O interface 20 of each computer 84, 86, 88, 90 and 92 is interconnected to network interfaces 20 of the remaining computers. Network interfaces 20 and adaptors 52 are interconnected to each other by cabling 85 and 87, and multiport hubs 94 and 97 respectively, to form two LANs. Computers 84, 86, 88, 90, and 92 are thus connected in two independent LANs. The two LANS are interconnected by cabling 185 connected between a port of hub 94 and a port of hub 97. This allows sharing of data between and across the two LANS. It should be noted that the LAN connecting adaptors 20 and the LAN connecting adaptors 52 are not redundant LANS. Hub 94 or hub 97 may further be connected to a remote computer, network or an internet. Alternatively, one of computers 84, 86, 88, 90, or 92 could comprise a further interface for connecting the computer, and hence the LAN to which it is connected, to a further data network. This interface could be a further Ethernet interface, an ATM network interface, or the like.

Each computer 84, 86, 88, 90 and 92 monitors both networks and switches between them. In the configuration of FIG. 7, only one of the network connections (ie redundant LAN connections) of adaptor 52 of each computer 74, 76, 78, 80 and 82 may be active at any one time. In contrast, both network connections to adaptor 20 and 24 of each computer 84, 86, 88, 90 and 92 illustrated in FIG. 8 may be active at the same time. Similarly, and as a consequence both networks of FIG. 7 (ie. LAN-A and LAN-B) carry identical traffic. The two LANs of FIG. 8, can, and usually do, carry different traffic which may be shared across hubs 94 and 97. Furthermore, the network architecture illustrated in FIG. 7 and FIG. 8 may be combined to provide both a redundant LAN interconnecting interfaces 52 and an independent LAN interconnecting interfaces 20.

In operation, one or more computers of the type of computer 21 as illustrated in FIG. 5, forming part of a LAN of FIGS. 7 or 8, is initially powered-up. This power-up sequence causes computer CPU 12 of that computer to initiate an initial program load sequence, based on code contained in ROM 16. In a typical UNIX environment, this initial program load sequence requires CPU 12 to obtain further load related instructions from console port 22. At the same time, powering-up of the computer causes peripherals 18, 20, 22, 24 and 52 of that computer to be powered-up, as a result of their interconnection with bus 30.

CPU 58 of adaptor 52, as illustrated in FIG. 6, upon power-up, similarly executes a series of initial program load instructions contained in ROM 62. Unlike UNIX computer 21, CPU 58 of adaptor 52, does not seek further load data from any console port. Instead, the operating system for adaptor 52 is within ROM 62. After executing a series of initialization instructions, CPU 58 establishes network communications via Ethernet adaptor 68 and hub 70. The operating system in ROM 62 implements its own TCP/IP stack, to receive, interpret, and react to IP packets received by adaptor 68. Thus, any data that is received via hub 70 and Ethernet adaptor 68 that conforms to the Ethernet protocol (data link layer) and further adheres to the TCP/IP protocol (network layer) may be processed by CPU 58 under control of the operating system in ROM 62. ROM 62 further contains a unique IP address used by each adaptor 52. The destination of packets of data, in IP format, received by adaptor 52 are identified by their IP address contained in the packet. Thus, another computer interconnected to the LAN may provide both administration and network data to any computer, by associating network data destined for a particular computer (ie. computer 74, 76, 78, 80, 82, or 84, 86, 88, 90, 92) with a first destination IP network address, unique to each computer and administrative data with a second network destination IP address unique to each adaptor 52 and also each computer. If the IP packet address matches the embedded address in ROM 62, associated with interface 52 of a target computer the packet is received and processed by the associated CPU 58. If the packet address does not match the embedded IP address, CPU 58 ignores the packet. The packet is also passed to the remainder of the LAN by hub 70, (FIG. 6) where it may be received and processed in response to recognition of a suitable IP packet address by the target computer or any other computer or adaptor 52 interconnected to the LAN. For example, a packet not recognized by an adaptor 52 of a computer may be recognized once received at network interface 24 of the same computer.

Further, serial port 26 (FIG. 2) on each console port 22 of each computer 21 is interconnected to serial port 66 (FIG. 6) of an associated adaptor 52 (FIG. 5). Therefore, CPU 58 also takes note when console port 22 of each computer 21 awaits further initial program load instructions or data. As console port 22 of each computer is interconnected to serial port 66 of adaptor 52, each computer 74, 76, 78, 80, 82, or 84, 86, 88, 90, 92 remains generally idle until further initial program load parameters are passed via port 66.

The operating system contained in ROM 62 contains sufficient code so that an adaptor 52 can offer networking services; establish a network session between adaptor 52 and a computer connected to the network; and execute an application at interface 52. For example, ROM 62 may include code to allow the processor of an adaptor 52 to execute the TELNET application to offer TELNET services. Thus, in response to an IP packet directed to a particular adaptor 52, and identified by the IP address for that adaptor, as described above, CPU 58 may establish a session and offer TELNET services between a service originator elsewhere on the LAN, or connected to the LAN remotely. The password for the TELNET session is also contained in the ROM 62. This TELNET session connects console port 22 connected to serial port 66, to Ethernet interface 68 by echoing each character received at serial port 66 to serial port 66 to Ethernet interface 68; similarly the TELNET session echos data received at Ethernet port 68 to serial port 66 and Ethernet port 68. Accordingly, complete access to console port 22 of a computer 74, 76, 78, 80, 82, or 84, 86, 88, 90, 92 of the type of computer 21 with an adaptor 52 may now be achieved by an Ethernet connection to hub 70. This same Ethernet connection may be used to pass network data identified by a distinct IP packet address, from and to network interface 24 by hub 70. Thus one physical connection now serves as the access point to an administration (or console port) network and a data network.

In order to initiate an orderly power-up of the network of FIG. 7 or FIG. 8 and each computer 74, 76, 78, 80, 82, or 84, 86, 88, 90, 92 attached to it, a TELNET session with adaptor 52 of at least one computer (an initial access computer) on the network is established. As noted, in the network of FIG. 8, this TELNET session may be established from a remote computer connected through hub 94 or 97. Once a TELNET session is established, sufficient program instructions may be loaded into the initial access computer via its console port 22 to establish and direct the initialization of other computers on the network, by the LAN interconnecting adaptors 52, which acts as both an administration and data exchange network. Alternatively, subsequent computers on the network may be accessed directly by the remote computer via their adaptor 52, to initialize these subsequent computers.

Additionally, in the UNIX environment, the console port remains active throughout the term of normal operation of the computer, as one of many UNIX processes. Adaptor 52 of each computer similarly remains active. Thus, provided that the UNIX operating system of each computer does not fail or crash, each computer may be administered at any time by any remote computer connected to the LAN connected to adaptors 52 (or by any computer on the LAN) by establishing a TELNET session with the adaptor 52 of a computer to be administered. As such, all normal administration functions, such as system shut down, the killing of crashed processes, file maintenance, and the like may be accomplished by any computer having network access to the LAN.

Further, a variety of environmental sensors 100, 102 and switches 104, 106 (FIG. 6a) may be interconnected to port 72. The sensors may provide CPU 58 of adaptor 52 with data relating to environmental conditions, such as ambient and processor temperatures, current draw and the like for an associated computer 21. The switches 104 may physically control peripherals and interfaces and are themselves controlled or actuated by CPU 58 through port 72. The adaptor thus serves as a telemetry interface that may monitor operating conditions of an associated computer 21 and initiate computer shutdown or resets in response to sensed conditions, by way of the Ethernet or serial connection to the computer. Alternatively, switch 104 may operate to initiate a hard (power) shutdown of a computer 21, in the event CPU 58 recognizes that the main computer UNIX operating systems fails to respond to commands presented at the console port of that computer. Similarly, switch 106 may be connected to the reset line of an associated computer 21 and initiate a reset. As well, switch 104 or 106 (or another similar switch) may control operation of a cooling fan for the computer. Other monitoring features, such as those disclosed in U.S. Pat. No. 5,594,893, the contents of which are hereby incorporated by reference, may be implemented by CPU 58 and sensors like sensors 102 and switches 104 connected to port 72. Information regarding the connected sensors and switches may be queried on the network connected to CPU 58, through a network service offered at the adaptor via interface Ethernet 68 and hub 70. The network service need not be the same network service used to access console ports 22. Alternatively, the operating system within ROM 62 may establish communication with another computer connected to the LAN, directly or indirectly, in response to a monitored condition, and initiate sending of a message or alarm.

It will of course be understood that the above described embodiments of the invention are susceptible to many modifications without departing from the spirit and scope of the invention. For example, adaptor 52 could be connected solely to computer 21 in the embodiment of FIG. 5 by way of serial port 66 to console port 22. Ethernet interface 68, could be independently connected to a third independent Ethernet for connection to an administration Ethernet, physically separate and apart from any data exchange network. Additionally, as no data needs to be exchanged between CPU 58 and CPU 12 via bus 30, connection of interface 52 to computer 21 by way of bus 30 is not absolutely necessary. Power may be provided to interface 52 by an alternate connection.

Possibly, the adaptor could be embodied in a card, to be install into an expansion slot of an existing computer, as described; as a card which is not installed in an expansion slot; as a stand-alone physical interface, which may be located external to an existing computer; or integrated directly on a motherboard of a computer. For example, network interface 24, console port 22 and adaptor 52, could be integrated to form a single network adaptor. This adaptor could communicate with CPU 12 by peripheral bus 30. The ROM 16 of computer 21 could be accordingly modified to query the network port of the integrated adaptor, instead of console port 22 at power-up.

Similarly, while the adaptor 52 has been described to function on an Ethernet, the invention may easily be adapted to work with any suitable data exchange network, such as an AppleTalk Network, an ATM network, or the like. Similarly, the invention need not rely on the IP protocol, but could use the IPX protocol or other suitable network layer protocol. The adaptor 52 need only be able to distinguish data directed to it for administration purposes, from other network data. The service offered by adaptor 52 need not be the TELNET service, but could be another network service such as FTP, SNMP or the like.

The described adaptor need not use a Motorola micro processor, and could be adapted using any suitable processor. Similarly, ROM 62 could be flash memory or NVRAM programable by the processor in response to instructions received from the network or a computer attached to it. This flash memory or NVRAM could thus update the operating system to provide other network services such as FTP or the like, and to change the embedded passwords, or network address. Hubs 70, 94 or 97 could be replaced by appropriate bridges, repeaters or multiplexers.

It will be further understood that numerous other modification and alterations of the above embodiments are possible without departing form the scope of the invention, which is defined by the claims.

We claim:

1. A method of providing administration and network data to a computer to be administered, said computer having a first and second processor, said method comprising the steps of
   a. associating said network data with a first network address;
   b. associating said administration data with a second network address;
   c. transferring said administration and network data in association with said first and second network addresses to said second processor;
   d. receiving said network and adminstration data in association with said first and second network addresses at said second processor;
   e. identifying said administration data by said second network address at said second processor;
   f. passing said administration data from said second processor to said first processor;
   g. processing said administration data at said first processor, to administer said computer.

2. The method of claim 1, further comprising the steps of,
   h. identifying said network data by said first network address at said computer;
   i. passing said network data to said first processor, for processing at said first processor.

* * * * *